United States Patent [19]

Honeycutt et al.

[11] Patent Number: 4,647,204

[45] Date of Patent: Mar. 3, 1987

[54] COMPENSATED DUAL CAVITY LASER GYRO

[75] Inventors: Thomas E. Honeycutt, Somerville; Thomas G. Roberts, Huntsville, both of Ala.

[73] Assignee: The United States of America as represented by the Secretary of the Army, Washington, D.C.

[21] Appl. No.: 766,363

[22] Filed: Aug. 16, 1985

[51] Int. Cl.$^4$ .............................. G01C 19/64
[52] U.S. Cl. .................................... 356/350
[58] Field of Search ........................ 356/350

[56] References Cited

U.S. PATENT DOCUMENTS

| | | | |
|---|---|---|---|
| 3,741,657 | 6/1973 | Andringa | 356/350 |
| 3,811,774 | 5/1974 | Honeycutt et al. | 356/5 |
| 4,035,081 | 7/1977 | Sepp et al. | 356/350 |
| 4,120,587 | 10/1978 | Vali et al. | 356/350 |
| 4,219,275 | 8/1980 | Henry | 356/350 |
| 4,429,398 | 1/1984 | Chenausky | 372/64 |
| 4,521,110 | 6/1985 | Roberts et al. | 356/350 |

OTHER PUBLICATIONS

Honeycutt et al, "FM-CW Radar Range Measurement with a $CO_2$ Laser", IEEE Journal of Quantum Electronics, vol. QE-8, No. 2, pp. 91-92, Feb. 1972.

Matthews et al, "A High Resolution Laser Gyro" National Aerospace and Electronic Conference, (Preprint, pp. 1-13), May 16-18, 1978.

Dorschner et al, "A Manganese Bismuth Magnetic Mirror for the Raytheon Laser Gyro" National Aerospace and Electronics Conference (5 pages), May 16-18, 1978.

Smith et al, "Biasing the Raytheon Four-Frequency Ring Laser Gyroscope" SPIE vol. 157, Laser Inertial Rotation Sensors (1978), pp. 21-29.

Dorschner et al, "Laser Gyro at Quantum Limit", IEEE Journal of Quantum Electronics, vol. QE-16, No. 12, Dec. 1980, pp. 1376-1379.

Barker et al, "Infrared . . . Transition Temperature", Physical Review Letters, vol. 17, No. 26, 26 Dec. 1966, pp. 1286-1289.

Chivian et al, A 10.6 $\mu m$ Scan Laser . . . Mirror", IEEE Journal of Quantum Electronics, vol. QE-15, No. 12, Dec. 1979, pp. 1326-1328.

*Primary Examiner*—Vincent P. McGraw
*Attorney, Agent, or Firm*—John C. Garvin, Jr.; Freddie M. Bush

[57] ABSTRACT

A laser gyro has two adjacent laser cavities which are parallel and separated so that there are no common parts between the respective mode volumes. Each cavity supports a wave traveling in only one direction. Passive optical means external to the cavities are provided for establishing these directions of travel. Additionally, the passive means allows quick reversal of these directions of travel, which allows for the compensation of all frequency shifts which are not proportional to rotations. The passive reversal is accomplished with an optical element that is controlled to act alternately as a window and then as a mirror for light of only one wavelength. The gyro produces two output waves whose frequencies are shifted in opposite directions by rotation. The two frequencies are mixed and the resultant beat frequency is detected by optical heterodyning. The response is a linear output signal. Very low rotation rates may be sensed down to zero rotation and its accuracy is limited by quantum effects.

7 Claims, 2 Drawing Figures

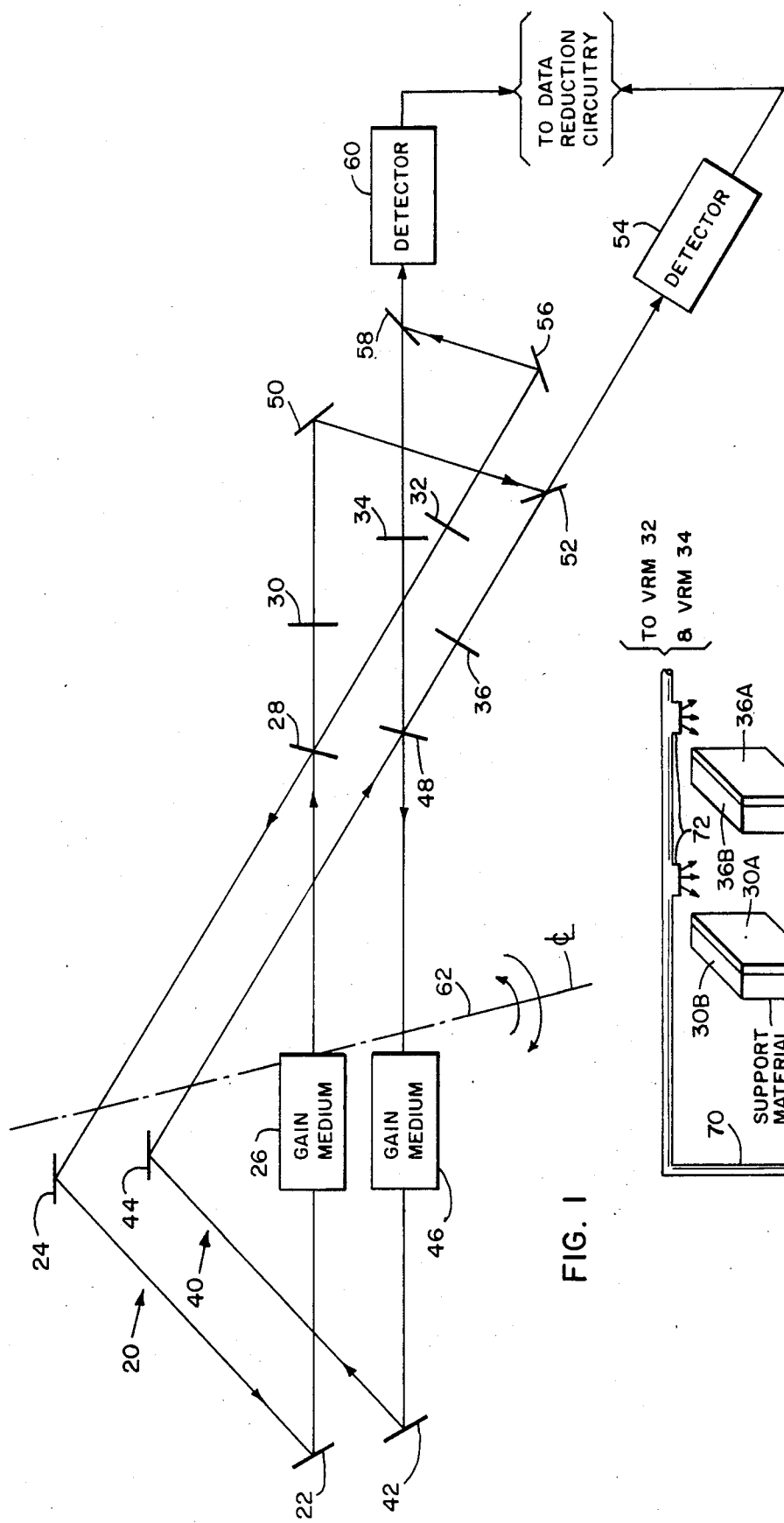

4,647,204

COMPENSATED DUAL CAVITY LASER GYRO

DEDICATORY CLAUSE

The invention described herein may be manufactured, used, and licensed by or for the Government for governmental purposes without the payment to us of any royalties thereon.

BACKGROUND OF THE INVENTION

The conventional ring laser gyroscope is based on two counter-rotating optical resonator modes. These modes split in frequency when the gyro rotates about its sensitive axes. The frequence split, which is proportional to the rotation rate and the area enclosed by the optical mode is measured by the use of optical heterodyne detection of the two frequencies. Ring laser gyroscopes show much promise for eliminating the spinning-mass gyroscopes with their many moving parts, high cost, complexity, and in some cases inaccuracy and unreliability. The accuracy of prior art ring laser gyroscopes has been limited by the well known lock-in phenomena where the two frequencies tend to be locked together and do not split for low rotation rates. Many well known techniques have been devised to partially remove or eliminate the lock-in limit. Two of these techniques utilize two ring lasers located very close to each other and operated so that the light wave travels in only one direction in each ring laser. In one of these, Sepp, et al., U.S. Pat. No. 4,035,081, this control is accomplished by incorporating in each cavity an active optical element such as a magneto-optical crystal to limit the direction of travel. However, Sepp et al require externally applied magnetic fields and controls which produce waste heat and, thus, requires additional active techniques to compensate for frequency changes produced by the temperature gradients. Using the techniques of Sepp et al allows the direction of travel of the waves in the two ring lasers to be reversed by reversing the fields on the active elements in the cavities, which allows one to attempt to compensate for nonrotational induced frequency changes—such as effects due to manufacturing tolerances and stress induced changes in path length. The stress may come from mechanical or temperature changes or from a combination of these. It would be more desirable to accomplish this reversal of the direction of travel in a passive way.

The other application of two ring lasers, Roberts et al, U.S. Pat. No. 4,521,110 issued June 4, 1985 is issued to the inventors of the subject invention, Thomas G. Roberts and Thomas E. Honeycutt. Roberts et al utilize a completely passive technique, referred to as negative feedback, to cause light to travel in only one direction in each cavity. This eliminates the need for external power supplies and controls, internally applied fields, active optical elements, and reduces the need for compensation of temperature variation induced effects. However, in both of these cases it is desirable to construct the two optical cavities as nearly identical as possible and to control the environment so that all changes in frequency are the results of rotations only. Roberts et al also disclose in detail background attempts to satisfactorily circumvent lock-in, degenerate modes of conventional ring lasers and associated loss problems, and phase matching problems encountered in prior art devices.

SUMMARY OF THE INVENTION

A laser gyro having two adjacent laser cavities which are separated physically so that there are no common parts between the respective mode volumes. Each cavity supports a wave traveling in only one direction. Passive optical means external to the cavities are provided for establishing these directions of travel and for quickly reversing these directions of travel, which allows for the compensation of all frequency shifts which are not proportional to rotations. The passive reversal is accomplished with an optical element that is controlled to act alternately as a window and then as a mirror for light of only one wavelength. The gyro produces two output waves whose frequencies are shifted in opposite directions by rotation. The two frequencies are mixed and the resultant beat frequency is detected by optical heterodyning. The response is a linear output signal. Very low rotation rates may be sensed down to zero rotation and its accuracy is limited by quantum effects.

BRIEF DESCRIPTION OF THE DRAWING

FIG. 1 is a simplified schematic of a preferred embodiment of the dual cavity laser gyro with compensation for nonrotational induced optical path length changes.

FIG. 2 is a simplified block diagram of a typical temperature control circuit for the system.

DESCRIPTION OF THE PREFERRED EMBODIMENT

Referring now to the drawings, wherein like numbers refer to like parts, FIG. 1 discloses a compensated laser gyro. In providing rotational motion measurements and especially for measurements where optical path length changes and frequency changes which are not induced by rotational motions are compensated for in an optically passive manner, the dual cavity laser gyro as set forth in the single figure may be used. The dual cavity laser gyro with compensation 10 comprises two nearly identical cavities 20 and 40 which are in adjacent parallel planes, being physically separated so that lock-in cannot occur. Cavity 20 comprises fully reflecting turning mirrors 22 and 24, a gain medium 26, and a partially reflecting mirror 28 which circumscribes a 360 degree optical path. The gain medium 26 is shown disposed between mirrors 22 and 28 but it may be placed in any one or all of the legs of the ring path. Partially reflecting mirror 28 is also in line with additional optical elements 30 and 32. Elements 30 and 32 are made of a film of vanadium dioxide ($VO_2$) on a faceplate of a material which transmits radiation at the wavelength of interest. For example, for a $CO_2$ laser the wavelength of interest is 10.6 microns. However, other wavelengths could be used. Cavity 40 is comprised of components similar to those of cavity 20 and similarly placed, comprising turning mirrors 42 and 44, gain medium 46, and partially reflecting mirror 48. Additionally, optical elements 34 and 36 are identical to elements 30 and 32 and are placed in line with mirror 48.

As noted, elements 30, 32, 34, and 36 are comprised of vanadium dioxide and a suitable support material Since the support material itself always passes the wavelength of interest, general reference to elements 30–36 is with reference to the $VO_2$ and the support material is understood to be there. Support material may be any non-interfering window material which transmits radiation at the wavelength of interest. Thus, for the 10.6 microns example wavelength, the support material may typically be germanium or coated salts.

The VO$_2$ film (elements 30-36) have a dual function-performing as either a window or as a mirror, depending on their respective temperatures. Each element is a window when its temperature is below 67 degrees centigrade (°C.) and a mirror when its temperature is above 67° C. Thus, each element is a variable reflectance mirror (VRM) of VO$_2$ film. VO$_2$ undergoes a first phase transition at 67° C. Below 67° C., VO$_2$ is in a dielectric phase, and the IR (infrared) transmittance is high. Above 67° C., the material is metallic and highly reflecting in the IR region.

The VO$_2$ film can be switched from a transmission mode to a reflection mode in times measured in microseconds or less, which is more than sufficient for laser gyro application. The energy required to heat or cool these elements may be carried by their support structure or mounts and is routinely accomplished in the prior art.

Typical of established prior art means for heating and cooling an element is by use of fluids carried by a spider that holds the element. An alternative means is as shown in FIG. 2.

FIG. 2 shows a temperature control unit 64 that thermostatically controls the output temperature of a coolant source 66 and controls the temperature and output of a thermal source, such as a thermal radiator or gas source 68. Coolant source 66 couples gas via piping 70 to the distribution outlets 72 that lie adjacent the variable reflectance mirrors (VRM's) 30, 36, 32, and 34. Thermal source 68 couples gas via piping 74 to distribution outlets 76 that lie adjacent VRM's 30 and 36. Similarly, piping 78 carries gas to VRM's 32 and 34. The VO$_2$ surface films, shown typically as 30A and 36A for elements 30 and 36, are constantly cooled by flowing coolant gas (such as helium, argon, or nitrogen) from source 68 over the surfaces. Without heat applied the surfaces are maintained at about 66 degrees centigrade but can be lower if desired. Elements 30A and 36A will pass radiation under this condition. When thermal source 68 is turned on, warm air offsets the effect of the cooling gas and allows the temperature of elements 30A and 36A to rise above 67 degrees centigrade, causing the elements to act as a mirror, reflecting radiation. Support structure 30B and 36B (such as a germanium flat) are not affected by the temperature changes. When elements 30, 32, 34, and 36 are maintained near 67° C. they can be readily switched between states merely by changing the temperature applied or by turning the heat source on or off. Alternatively, this can be done with a steady state heat source and an on-off action with a coolant. Repetition rates on the order of 20 cycles per second are provided by this simple system.

The rate at which the temperature is cycled depends on the thermal mass and thermal conductivity of the particular support material. However, the temperature range (a few degrees centigrade) through which the VO$_2$ has to be cycled is small and, therefore, allows for the window/mirror to be switched many times per second, which is more than adequate for operation.

In operation, with the wave in cavity 20 traveling counter-clockwise and the wave in cavity 40 traveling clockwise, optical element 30 is below 67° C. and functions as a window which transmits the output of the ring from mirror 28 to a mirror 50. The output is reflected from mirror 50 to beam splitter 52 where it is reflected to the detector 54. Optical element 32 is held above 67° C. during this time and functions as a mirror which supplies the negative feedback into the cavity and allows waves to travel in cavity 20 in only a counter-clockwise direction. The element 36 is also below 67° C. during this time and is a window which transmits the output of the ring 40 to and through the beam splitter 52 and onto the detector 54 where it is detected along with the beam from cavity 20 to produce a beat frequency that is proportional to the frequence difference in the two beams. The element 34 is above 67° C. during this time and is a mirror which supplies negative feedback to cavity 40 and allows waves to travel in only a clockwise direction in the cavity. During this time, the mirror 56, beam splitter 58 and detector 60 are not used.

When the temperatures on the VO$_2$ mirror/windows are reversed, elements 30 and 36 function as a mirror, while elements 32 and 34 function as a window, the respective roles being reversed. Under these conditions the waves now travel clockwise in cavity 20 and counter clockwise in 40. The mirror 56 and beam splitter 58 are now used to combine the outputs of cavities 20 and 40 on detector 60. During this time the mirror 50, beam splitter 52, and detector 54 are not used. The difference frequency outputs of heterodyne detectors 54 and 60 are coupled for display, recording or to other data reduction circuitry according to state of the art procedures.

When the system is subjected to rotation in the planes of the cavities, i.e., about an axis 62 which is perpendicular to the planes of cavities 20 and 40, rotation can be measured. For measurement, elements 30 and 36 function simultaneously as either a mirror or a window depending on the temperature applied. Similarly during this time of measurement, elements 32 and 34 function simultaneously as the opposite of elements 30 and 36. Thus, elements 30-36 function as a temperature controlled window or a mirror. After a first measurement the temperatures are changed on the elements 30-36 and rotation is measured again.

The difference in these two measurements is due to nonrotational induced changes and may be subtracted out as follows:

Let $f_1$ be the frequency in cavity 20 in the absence of rotation and let the frequency be increased by an amount $\delta$ due to rotation, then if $f_2$ is the frequency in cavity 40 in the absence of rotation $$\Delta f = (f_1 + \delta) - (f_2 - \delta) = (f_1 - f_2) + 2\delta \tag{1}$$

for the beat frequency when elements 30 and 36 are above 67° C.

When the temperatures are reversed the beat frequency is given by:

$$\Delta f' = (f_1 - \delta) - (f_2 + \delta) = (f_1 - f_2) - 2\delta \tag{2}$$

$\Delta f'$ is the frequency difference between lasers when the direction of rotation in each ring is switched from what they were for calculation of $\Delta f$. Thus taking $\Delta f - \Delta f'$ results in $4\delta$ for the frequency change due to rotation alone. The frequency difference $(f_1-f_2)$ due to steady state manufacturing tolerance has been compensated.

For nonsteady state frequency changes due to mechanical or temperature variation produced stresses:

$$\Delta f = [(f_1+a)+\delta] - [(f_2+b)-\delta] = (f_1+a)-(f_2+b)+2\delta \tag{3}$$

where a and b are stress produced frequency changes and $$\Delta f'' = [(f_1+a)-\delta] - [(f_2+b)+\delta] = (f_1+a)-(f_2+b)-2\delta. \quad (4)$$

Again, $\Delta f' - \Delta f'' = 4\delta$ and the stress produced changes have also been compensated.

The turning mirrors 22, 24, 42, and 44 and the partially reflecting mirrors 28 and 48 are shown in the drawing as separate mirrors, which they may well be. However, these elements (22, 24, 42, and 44) as well as mirrors 28 and 48 may be single mirrors which are large enough to serve both functions since the planes of rotation are parallel and adjacent.

Thus, a passive method is disclosed that allows the travel direction of the traveling waves to be reversed and thereby compensate for nonrotational induced optical path differences and resulting frequency shifts. The dual cavity ring laser gyro uses only two frequencies, and has no lossy elements. The normal lossy bias elements are not necessary since lock-in is avoided by separating the cavities and each cavity contains only a vacuum or a nonresonant gas. Therefore, it is not necessary to supply large electric or magnetic fields to drive them. The response of the gyro device is linear; its accuracy is limited by quantum noise. The lock-in phenomenon cannot occur. The possibility of lock-in is removed by using two nearly identical optical cavities which are separated physically. A single traveling wave is set up in each of these cavities, one traveling CW and the other traveling CCW. The resonant frequency of two cavities is different because small differences in optical path lengths cause them to be oscillating in different longitudinal modes. If they did oscillate at the same frequency lock-in would still not occur because these modes are not degenerate; that is, they are separated in phase space by the spatial part of their phase space coordinates. The two cavities can be made nearly identical by making them in the same piece of material as taught by applicants in their U.S. Pat. No. 4,521,110 issued June 4, 1985. The cavity material may vary depending on the particular laser used and in the application for which the gyro is to be used. The cavity may be a vacuum or a non-resonant gas that is transparent at the particular frequency $f_1$ or $f_2$. It is a true resonant cavity wherein the wave always travels in straight lines even though the direction is changed by reflection.

Regardless of whether separate gain mediums are used or a common medium is used the gain mediums are arranged so that one cavity lies directly above the other and has a common central axis normal to the planes of the cavities.

Although the present invention has been described with reference to the preferred embodients workers skilled in the art will recognize that changes may be made in form and detail without departing from the spirit and scope of the invention. Accordingly, the scope of the invention should be limited only by the claims appended hereto.

We claim:

1. A compensated dual cavity laser gyro for determining angular rotation of an area, comprising: first and second, parallel, optical paths each circumscribing an area of 360° and each providing a resonant cavity, a laser gain medium proposed in each optical path for inducing separate laser oscillation in each cavity, first and second extracting means for passing a portion of the laser oscillation from each cavity, first and second output optical paths external of said first cavity and having a common path junction at said first extracting means; first and second variable reflectance means within the respective output optical paths for providing an output at alternate intervals along said first and second output optical paths and simultaneously providing negative feedback at alternate intervals along said second and first output optical paths for limiting laser oscillation in said first cavity to a single traveling wave; third and fourth output optical paths external of said second cavity and having a common path junction at said second extracting means; third and fourth variable reflectance means within the respective third and fourth output optical paths for providing an output at alternate intervals along said third and fourth output optical paths while simultaneously providing negative feedback at alternate intervals along said fourth and third output optical paths for limiting laser oscillation in said second cavity to a single traveliong wave; and means for detecting the portions of removed laser oscillations for indicating angular rotation of the optical paths; and said traveling wave in said first cavity always traveling in the opposite direction to the traveling wave in the second cavity.

2. A dual cavity laser gyro as set forth in claim 1 wherein each of said variable reflectance means is a vanadium dioxide film.

3. A dual cavity laser gyro as set forth in claim 2 and further comprising temperature control means coupled to each of said variable reflectance means.

4. A dual cavity laser gyro as set forth in claim 3 wherein said first and third variable reflectance means are simultaneously controlled at a first temperature range and said second and fourth variable reflectance means are simultaneously controlled at a second temperature range for controlling the said outputs at alternate intervals along the said first, second, third, and fourth output optical paths.

5. A dual cavity laser gyro as set forth in claim 4 wherein each of said cavities further comprise a plurality of turning mirrors therein for directing laser oscillation therein in respective straight line paths around said 360° area.

6. A dual cavity laser gyro as set forth in claim 5 wherein said detection means comprises a first detector for receiving the portions of removed laser oscillations directed along said first and third output paths, a turning mirror in said first output path, and a beam splitter in said third output path for bringing the output laser oscillations in the respective paths together on said first detector; said detector heterodyning the portions of removed oscillations for providing a beat frequency output.

7. A dual cavity laser gyro as set forth in claim 6 wherein said detection means further comprises a second detector for receiving the portions of removed laser oscillations directed along said second and fourth output paths, a turning mirror in said second output path and a beam splitter in said fourth output path for bringing the output laser oscillations in the respective paths together on said second detector; said second detector heterodyning the portions of removed oscillations for providing a beat frequency output identical to that of the first detector output.

* * * * *